Patented Nov. 21, 1944

2,363,048

UNITED STATES PATENT OFFICE 2,363,048

CERTAIN WATER-SOLUBLE HIGH MOLAL OXYALKYLATED ESTERS: AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application July 7, 1941, Serial No. 401,378. Divided and this application March 9, 1943, Serial No. 478,589

12 Claims. (Cl. 260—404.5)

This invention relates to a new chemical product, our present application being a division of our pending application for patent Serial No. 401,378, filed July 7, 1941, for Process for breaking petroleum emulsions, which subsequently matured as U. S. Patent No. 2,324,490, dated July 20, 1943.

One object of our invention is to provide a new chemical product or compound that is particularly adapted for use as a demulsifier in the resolution of crude oil emulsions.

Another object of our invention is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter may be employed in other arts, as hereinafter indicated.

The new chemical compound or composition of matter herein described, is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, in which T is an alcohol residue, is reacted with a polybasic carboxy acid, which, similarly, may conveniently be indicated as being of the dibasic type, by the formula HOOC.D.COOH, in which D is a dicarboxy acid residue, then the fractional ester obtained by reaction between equimolar quantities may be indicated by the following formula:

HOOC.D.COO.T 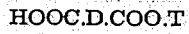

The polyethylene glycol may be characterized by materials of the kind such as heptaethylene glycol, octaethylene glycol, nonaethylene glycol, decaethylene glycol, to and including heptadecaethylene glycol. For convenience these polyethylene glycols may be indicated by the following formula:

$$OH(C_2H_4O)_mH$$

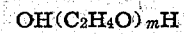

in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

$$OH(C_nH_{2n}O)_mH$$

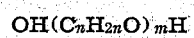

in which $m$ has its previous significance, and $n$ represents a numeral varying from 2 to 4.

Thus, the bulk of the materials herein contemplated, particularly for use as demulsifiers, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

$$T.OOC.D.COOH + OH(C_2H_4O)_mH +$$
$$HOOC.D.COO.T \rightarrow$$
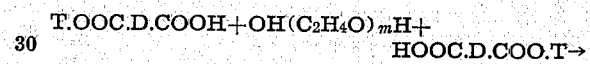
$$T.OOC.D.COO(C_2H_4O)_{m-1}C_2H_4.OOC.D.COO.T$$
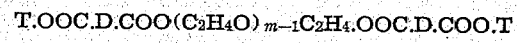

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8-12 oxyalkylene groups, particularly 8-12 oxyethylene groups. The preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of hepta-, ethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters, are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic compounds employed as reactants in one mode of manufacture of the present compounds are basic hydroxylated acylated polyamino compounds free from ether linkages. Such compounds are described inter alia in U. S. Patent No. 2,243,329, dated May 27, 1941, to De Groote and Blair. For instance, this particular patent describes a basic type acylated polyamine of the following formula:

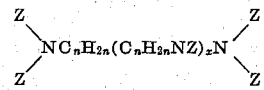

in which $n$ represents a small whole number varying from 2 to 10; $x$ is a small whole number varying from 1 to 10; Z is a member of the class consisting of H, RCO, R'CO, and D, in which RCO represents an acyl radical derived from a higher molecular weight carboxy acid; R'CO is an acyl radical derived from a lower molecular weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of:

(a) Acyloxyalkylene radical in which the acyl group is RCO; and (b) Joint occurrence of an amido radical in which the acyl group is RCO and a hydroxyalkyl radical.

Needless to say, compounds of the kind therein described may be derived from polyamines having only two amino nitrogen atoms, as differentiated from polyamines having 3 amino nitrogen atoms or more. Thus, in the above formula, $x$ may represent zero, as well as the numeral 1 to 10. It is obvious that numerous examples of the compounds indicated by the above formula are hydroxylated, due to the presence of one or more hydroxylated radicals of the following types:

(a) There may be present a hydroxyethyl group or a hydroxypropyl group or the like;

(b) The acyl group of the higher molecular weight carboxy acid may contain a hydroxyl group, as, for example, ricinoleic acid, hydroxystearic acid, etc.;

(c) The low molecular weight carboxy acid present may have a hydroxyl group in the acyl radical, such as would be the case when the radical is derived from lactic acid; and (d) The amines above described may be considered as derivatives of dichloralkanes or alkylene dichlorides. This is discussed clearly in the aforementioned De Groote and Blair patent. If such amines, which are derivatives of propylene dichloride, as indicated by the following composition:

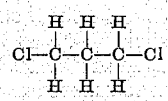

are, in turn, derived from glycerol dichlorhydrin (betahydroxy propylene dichloride) of the following composition:

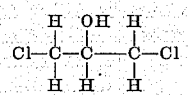

it is obvious that another means is available for introducing an alcoholiform hydroxyl radical. Since this particular application or modification is extremely narrow in scope, and applies only to the instances where the alkylene group is a propylene radical, it is understood that in the hereto appended claims it is intended that wherever a propylene group is included, the hydroxy propylene group is considered as the functional equivalent, for the reasons stated.

Although in the compounds above described the radical RCO may be derived from a higher molecular weight carboxy acid, in the present instance the invention is concerned with the particular type, in which RCO is derived from a more narrow class, to wit, detergent-forming monocarboxy acids.

It is well known that certain monocarboxy organic acids containing eight carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids, for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

We have found that the new composition of matter herein contemplated, which is most valuable as a demulsifier, is preferably derived from unsaturated fatty acids having 18 carbon atoms. Such unsaturated fatty acids include the fatty acids, such as oleic acid, ricinoleic acid, linoleic acid, linolenic acid, etc. One may employ mixed fatty acids, as, for example, the fatty acids obtained from hydrolysis of cottonseed oil, soya- bean oil, etc. Our preferred demulsifier is obtained from unsaturated fatty acids, and more especially, unsaturated fatty acids, which have been subjected to an oxidation or oxyalkylation step, such as oxyethylation. Of the various unsaturated fatty acids, our choice is the hydroxylated type, to wit, ricinoleic acid.

For purposes of brevity, the bulk of any subsequent description will be concerned with fatty acids, and particularly unsaturated fatty acids. Further reference to other detergent-type monocarboxy acids is quite limited; but attention is directed to the fact that an adequate description is found in the aforementioned De Groote and Blair patent. The following examples are substantially as they appear in said patent. One must not forget, however, that in addition to the amines described in said patent as reactants, one can also use reagents such as ethylene diamine, bis(hydroxyethyl) ethylene diamine, tris(hydroxyethyl) ethylene diamine, etc. In view of what is said in the aforementioned De Groote and Blair patent, it will be obvious why the description of the amide is given as a primarily raw material.

*Amide—Example 1*

283 parts of stearic acid amide are heated with 438 parts of triethylene tetramine for 10 hours to about 130° C. until a test portion is soluble in diluted hydrochloric acid; at the end of the reaction the pressure is preferably lowered to about 15 mm. Hg. Thereby 380 parts of a product probably corresponding to the formula $$C_{17}H_{35}CO.NH(C_2H_4NH)_2C_2H_4NH_2$$

(monostearyl triethylene tetramine) are obtained.

*Amide—Example 2*

281 parts of oleic acid amide yield with 584 parts of triethylene tetramine, when heated for 10 hours to about 130° C., 400 parts of a product which is soluble in diluted hydrochloric acid, and probably corresponds to the monooleyl triethylene tetramine.

*Amide—Example 3*

283 parts of stearic acid amide are heated in the same way as described in Examples 1 and 2 with 400 parts of a mixture of polyalkylene polyamines obtainable by heating ethylene dichloride with ammonia under pressure and removing any ethylene diamine formed during the latter reaction. After distilling the excess of bases under reduced pressure, 430 parts of a paste are obtained which is soluble in diluted acids.

*Amide—Example 4*

300 parts of ricinoleic acid amide yield with 400 parts of a mixture of bases according to Example 3, when heated for about 8 hours to 150–160° C., 450 parts of a mixture of acylated bases which is easily soluble in diluted acetic or hydrochloric acid.

*Amide—Example 5*

From 300 parts of ricinoleic acid amide and 400 parts of a mixture of polyalkylene polyamines according to Examples 3 and 4, by heating for several hours to 150° C., simultaneously passing a current of dry air free from $CO_2$, and finally removing the excess of bases partly by distilling under reduced pressure and partly by washing with water, there are obtained 430 parts of a mixture of polyalkylene polyamines which is acylated by the radical of ricinoleic acid.

Amide—Example 6

100 parts by weight of olive oil and 100 parts by weight of diethylenetriamine are heated to about 180–200° C. until a test portion of the reaction mixture is soluble in dilute hydrochloric acid. After distilling off the excess of diethylenetriamine, advantageously under reduced pressure, there remains a strongly viscous mass, the hydrochloric acid solution of which has great foam-forming properties.

A similar product is obtainable by heating free oleic acid with a large excess of diethylenetriamine under the same conditions.

Amide—Example 7

310 parts by weight of the ethylester of oleic acid are heated with 286 parts by weight of triethylene tetramine at about 160° C. for 12 hours when a homogeneous solution is formed; the alcohol formed and the excess of triethylenetetramine are distilled off. The residual reaction product forms a brown oil, which is difficultly soluble in water and readily soluble in alcohol, benzene and dilute hydrochloric acid.

A quite similar product is obtainable by heating free oleic acid with an excess of triethylene tetramine to about 180–200° C. and distilling off the excess of triethylenetetramine under reduced pressure.

200 parts by weight of olive oil are heated at 180–200° C. with 300 parts by weight of a mixture of bases, which is obtained by the action of ammonia on ethylene chloride at 80–120° C. under pressure of 10 atm. and after distilling off the ethylene diamine, said mixture of bases boiling at about 15 mm. mercury between 90 and 300° C. When a test portion of the reaction product is smoothly soluble in dilute hydrochloric acid, the water formed and the excess bases are distilled off under reduced pressure and a yellowish brown oil is obtained, a solution of which in dilute hydrochloric acid can be used as a washing or wetting agent.

Amide—Example 9

350 grams of monostearin and 300 grams of triethylenetetramine are heated together at 180–200° C. for 3 to 4 hours and then the displaced glycerine and the excess triethylene-tetramine were washed out with water and the resulting product dried.

Amide—Example 10

In the prior examples tetraethylene pentamine is substituted for the amines employed in the prior examples by using a suitable molecular equivalent, but without increasing the amount of fatty acid compound employed.

Amide—Example 11

Purified naphthenic acids derived from Gulf Coast crudes are employed in various examples preceding.

Amide—Example 12

Carboxy acids derived from oxides of Pennsylvania crude oil and having approximately 10–14 carbon atoms per mole of fatty acid, are substituted in the previous examples.

Basic type oxyalkylation compound of amido derivative of polyamine—Intermediate Example 1

Materials of the kind described in Amide, Examples Nos. 1–12, preceding, are treated with one mole of ethylene oxide in the manner previously described, so as to introduce one hydroxyethyl radical. Such reaction may be illustrated in the following manner:

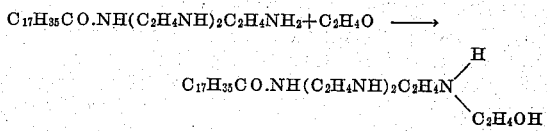

It is to be noted that in the above reaction, the ethylene oxide radical adds at the basic amino nitrogen atom, although obviously, it might add at the non-basic amido nitrogen atom.

Basic type oxyalkylation compound of amido derivative of polyamine—Intermediate Example 2

The same procedure is followed as in the preceding example, except that more than one hydroxyalkyl group, or rather, hydroxyethyl group, is introduced, the preference being to introduce two or three hydroxyethyl groups.

Basic type oxyalkylation compound of amido derivative of polyamine—Intermediate Example 3

Propylene oxide is substituted for ethylene oxide in Examples 1 and 2, preceding.

Basic type oxyalkylation compound of amido derivative of polyamine—Intermediate Example 4

Glycid is substituted for ethylene oxide in Examples 1 and 2, preceding.

Oxyalkylation derivatives of polyamine—Example 1

Suitable quantities of diethylene triamine are treated with ethylene oxide in various amounts, so as to introduce 1, 2 and 3 hydroxyethyl groups. The temperature employed is approximately 180–240° C., and the catalyst is preferably sodium methylate in amounts varying from ½% to 1½%. Such reaction may be illustrated as follows:

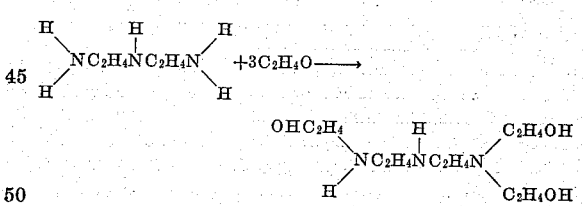

The ethylene oxide may, of course, combine with the hydrogen atom attached to the central amino nitrogen atom.

Oxyalkylation derivatives of polyamine—Example 2

Triethylene tetramine is substituted for diethylene triamine in Example 1.

Oxyalkylation derivatives of polyamine—Example 3

Tetraethylene pentamine is substituted for diethylene triamine in Example 1.

Oxyalkylation derivatives of polyamine—Example 4

Pentaethylene hexamine is substituted for diethylene triamine in Example 1.

Basic type acylation derivative of oxyalkylated polyamine—Intermediate Example 5

A material of the kind described in Oxyalkylation derivatives of polyamine, Example 1, is acylated in the same manner in which amides are obtained in Amide, Examples 1–12, previously described. Such acylation reaction may be illustrated thus:

$$\underset{H}{\overset{OHC_2H_4}{>}}NC_2H_4NC_2H_4N\underset{C_2H_4OH}{\overset{C_2H_4\overline{OH+H}OOC.R_2}{<}}$$

in which $R_2COOH$ represents a higher fatty acid or the like.

*Basic type acylation derivative of oxyalkylated polyamine—Intermediate Example 6*

A material of the kind described in Oxyalkylation derivatives of polyamine, Example 2, is acylated in the same manner in which amides are obtained in Amide, Examples 1–12, previously described.

*Basic type acylation derivative of oxyalkylated polyamine—Intermediate Example 7*

A material of the kind described in Oxyalkylation derivatives of polyamine, Example 3, is acylated in the same manner in which amides are obtained in Amide, Examples 1–12, previously described.

*Basic type acylation derivative of oxyalkylated polyamine—Intermediate Example 8*

A material of the kind described in Oxyalkylation derivatives of polyamine, Example 4, is acylated in the same manner in which amides are obtained in Amide, Examples 1–12, previously described.

*Basic type re-acylated oxyalkylation compound of amido derivative of polyamine—Intermediate Example 9*

Materials of the kind exemplified by Intermediates 1–4, preceding, which have been designated for convenience as "Basic type oxyalkylation compound of amido derivative of polyamine," i. e., prepared by converting the polyamine into an amide and then subjecting the same to oxyalkylation, may, of course, be re-acylated, or acylated further, so as to introduce acyl groups of the kind described. Under such circumstances one invariably obtains the mixed type, i. e., the ester-amide type, provided that there has been total oxyalkylation. Excellent intermediates are obtained by such process, i. e., the re-acylation, or second acylation, of materials of the kind exemplified by Intermediates 1–4, inclusive, and particularly when such re-acylation takes place by means of detergent-forming acids, which, in the preferred form, are illustrated by fatty acids, and more particularly, by the hydroxylated fatty acid type. The preferred member of this type, in the present instance, as in other instances, is ricinoleic acid.

Having obtained basic hydroxylated polyamine compounds of the kind previously described, the next step is to obtain fractional esters derived from nonaethylene glycol of the kind described in the earlier part of the present disclosure. Such materials may be illustrated by the following examples:

*Glycol ester intermediate product—Example 1*

One pound mole of nonaethylene glycol is treated with two pound moles of maleic anhydride, so as to form nonaethylene glycol dihydrogen dimaleate. The reaction may be shown more simply as if involving the acid instead of the anhydride, thus:

$$HOOC.C_2H_4COO\overline{H+HO}CH_2(CH_2OCH_2)_8$$
$$CH_2\overline{OH+H}OOC.C_2H_4COOH$$

*Glycol ester intermediate product—Example 2*

A mixture of lower non-distillable polyethylene glycols, representing approximately deca- to tetradecaethylene glycol, is substituted for nonaethlyene glycol in the preceding example.

*Glycol ester intermediate product—Example 3*

A 50–50 mixture of nonaethylene glycol and lower nondistillable polyethylene glycols of the kind described in the previous example is substituted for nonaethylene glycol in Example 1.

*Glycol ester intermediate product—Example 4*

Adipic acid is substituted for maleic anhydride in Examples 1–3, preceding.

*Glycol ester intermediate product—Example 5*

Oxalic acid is substituted for maleic anhydride in Examples 1–3, preceding.

*Glycol ester intermediate product—Example 6*

Citric acid is substituted for maleic anhydride in Examples 1–3, preceding.

*Glycol ester intermediate product—Example 7*

Succinic anhydride is substituted for maleic anhydride in Examples 1–3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure, and requires no further elaboration.

*Composition of matter—Example 1*

Two pound moles of a material exemplified by Basic type oxyalkylation compound of amido derivative of polyamine, Intermediate Example 1, are reacted with one pound mole of a glycol ester intermediate product of the kind described under Glycol ester intermediate products, Examples 1, 2 and 3, preceding. Such reaction is continued until all the carboxyl acidity has disappeared.

The time of reaction may vary from a few hours to as many as 20 hours.

*Composition of matter—Example 2*

Basic type oxyalkylation compound of amido derivative of polyamine, Intermediate Example 2, is substituted for Basic type oxyalkylation compound of amido derivative of polyamine, Intermediate Example 1, in the example preceding.

*Composition of matter—Example 3*

Glycol ester intermediate products of the kind exemplified by Glycol ester intermediate products, Examples 4–7, preceding, are substituted for the products of the kind exemplified in Glycol ester intermediate products, Examples 1, 2 and 3, preceding, in the previous two examples.

It is to be noted that this second step is an esterification reaction, and the same procedure is employed as suggested above in the preparation of the intermediate product. Needless to say, any particular method may be used to produce the desired compounds of the kind indicated. In some instances, it may be desirable to conduct the esterification reaction in the presence of a non-volatile inert solvent which simply acts as a diluent or viscosity reducer.

In the preceding examples, attention has been directed primarily to the monomeric form, or at least, to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

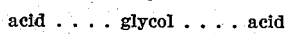
acid . . . . glycol . . . . acid

If, however, one prepared an intermediate product employing the ratio of three moles of maleic anhydride and two moles of nonaethylene glycol, the tendency would be to produce a product which might be indicated in the following manner:

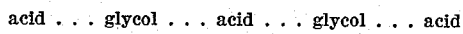
acid . . . glycol . . . acid . . . glycol . . . acid

Similarly, three moles of the glycol and four moles of the acid might tend to give a combination which may be indicated thus:

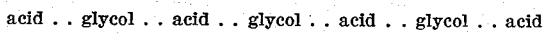
acid . . glycol . . acid . . glycol . . acid . . glycol . . acid

Another way of stating the matter is that the composition may be indicated in the following manner:

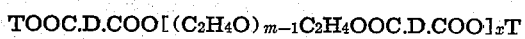
$TOOC.D.COO[(C_2H_4O)_{m-1}C_2H_4OOC.D.COO]_xT$ in which the characters have their previous significance and $x$ is a relatively small whole number less than 10, and probably less than 5; and in the monomeric form $x$, of course, is 1. The limitations on the size of $x$ are probably influenced largely by the fact that reaction leading to further growth is dependent upon random contact.

Some of the products are self-emulsifiable oils, or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid, instead of adipic acid; and (d) By using an amino body having fewer high molal acyl groups, or more amino nitrogen atoms, or any other obvious variant.

Indeed, in many instances the acylated polyamino compound is water-soluble prior to reaction with the glycol ester. It is to be noted that in this instance one is not limited to hydroxylated materials which are water-insoluble prior to reaction with a glycol ester; but they may, in fact, be perfectly water-soluble.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellant textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote and Keiser.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like, is just as practicable and less expensive.

In the hereto appended claims, it is intended that the monomeric forms contemplate also the polymeric forms, insofar that the polymeric forms are nothing more or less than a repetition of the monomeric forms several times over, with the loss of one or more moles of water.

What has just been said can be recapitulated and presented in more formal agreement with customary nomenclature in the following manner: As stated previously in the broadest aspect, the polyalkylene glycols employed may be indicated by the following formula:

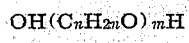

in which $m$ has its previous significance, and $n$ represents a numeral varying from 2 to 4. In simple form, this structure can be indicated in the following manner:

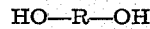

in which the divalent radical —RO— is the divalent radical —$(C_nH_{2n}O)_m$— as previously defined.

The dibasic acid previously referred to, in its simplest form as HOOC.D.COOH, is more completely portrayed by the following formula:

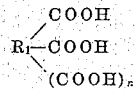

in which $R_1$ is the polybasic carboxy acid residue, except in the unique case of oxalic acid, and $n'$ is the numeral 0 or 1, depending upon whether or not the polybasic acid is dibasic or tribasic.

If the polybasic acid just described is indicated by $R'$, and if the glycol just described is indicated by $R''$, then the acidic or fractional ester previously described in the specification may be indicated by the following formula:

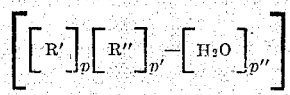

in which $p$ and $p'$ represent numerals varying from 1 to 10, and $p''$ represents a numeral varying from 1 to 20, and $R'$ and $R''$ have their prior significance, and the ratio of $p$ to $p'$ varies from 2:1 to $p+1:p'$, with the obvious proviso that such ester must contain at least two free carboxyl radicals.

Previous reference has been made to the hydroxylated acylated polyamino compound free from ether linkages and of the following composition:

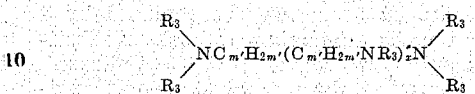

in which $m'$ represents a small whole number varying from 2 to 10; $x$ is a small whole number varying from 0 to 10; $R_3$ is a member of the class consisting of H, $R_4CO$, $R_5CO$, and $R_6$, in which $R_4CO$ represents an acyl radical derived from a detergent-forming monocarboxy acid; $R_5CO$ is an acyl radical derived from a lower molecular weight carboxy acid having 6 carbons atoms or less; and $R_6$ is a member of the class consisting of alkyl, hydroxyalkyl, aminoalkyl, and acyloxyalkylene, in which instance the acyl group is a member of the class consisting of $R_4CO$ and $R_5CO$; and the acylated polyamine is further characterized by the fact that there must be present a member of the class consisting of (a) Acyloxyalkylene radical, in which the acyl group is $R_4CO$; and (b) Joint occurrence of an amido radical, in which the acyl group is $R_4CO$ and a hydroxyalkyl radical.

It is more convenient to consider the previous compound as an alcohol of the formula

in which $m'$ varies from 1 to 10. $R_7$ is the radical obtained by the dehydroxylation of the previously described basic hydroxylated acylated polyamino compound. It is to be noted that one or more of the hydroxyls may be part of an acyl radical, such as a ricinoleyl radical, or part of an alkylol radical, such as an ethanol radical. In view of the fact that the amino compound may contain at least as many as five amino nitrogen atoms, and in view of the fact that the hydrogen atoms attached to all such amino nitrogen atoms may be converted into alkanol radicals or hydroxyalkanol radicals by the action of ethylene oxide, or its equivalent, or by the action of glycide, or its equivalent, and since additionally certain acyl radicals, such as the ricinoleyl radical may contain alcohol hydroxyl radicals, it is obvious that, considered as an alcoholic compound, the previously described polyamino compound may have anywhere from 1 to 10 hydroxyl radicals.

The composition of matter herein contemplated is best represented as an ester obtained by the esterification reaction involving the acidic fractional ester above described and the hydroxylated acylated aminoalcohol previously depicted in detail. The final composition may be obtained in any suitable manner, and would properly represent the final product, regardless of the succession of intermediate steps. So portrayed, the structural formula is as follows:

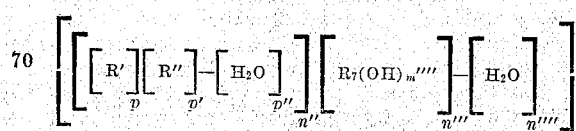

in which $n''$ represents a numeral varying from 1 to 10, $n'''$ represents a numeral varying from 1 to 4, and $n''''$ represents a numeral varying from 1 to 10.

It has been previously pointed out in the specification that any residual carboxylic radicals, and especially one obtained from tribasic acids, could be neutralized with a variety of suitable basic materials. In other words, a residual carboxylic hydrogen atom may be replaced by a metallic atom, an ammonium radical, or substituted ammonium radical, as previously indicated. Under such circumstances, any residual carboxylic radical, instead of appearing thus: COOH, may, in essence, be the radical COOR₈ represents a cation including the acidic hydrogen atom. This can be best disposed of by rewriting the formula for the polybasic carboxy acid, thus:

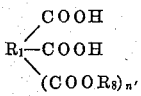

in which all of the characters have their prior significance.

Having thus described our invention, what we claim as new and desire to secure by Letters Patent is:

1. A water-soluble ester of the formula:

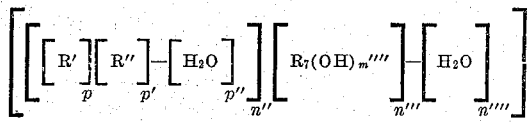

in which $n''$ represents a numeral varying from 1 to 10, and $n'''$ represents a numeral varying from 1 to 4, and $n''''$ represents a numeral varying from 1 to 10, and in which $p$ and $p'$ represent numerals varying from 1 to 10, and the ratio of $p$ to $p'$ varies from 2:1 to $p+1:p'$, and $p''$ represents a numeral varying from 1 to 20, and $R'$ is a glycol of the formula HO—R—OH in which the divalent radicals —RO— is the divalent radical —$(C_nH_{2n}O)_m$— in which radical, in turn, $n$ represents a numeral varying from 2 to 4, and $m$ represents a numeral varying from 7 to 17; $R''$ is the polycarboxy acid,

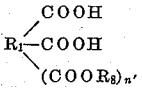

in which $R_1$ is the polycarboxy acid residue, and $R_8$ is a cation, and $n'$ is the numeral 0 or 1; $R_7(OH)_{m''''}$ is a hydroxylated acylated aminoalcohol in which $m''''$ represents a numeral from 1 to 3, and $R_7$ is the dehydroxylated residue of the hydroxylated acylated polyamino compound, in which carbon atom chains are uninterrupted by oxygen atoms, and of the following composition:

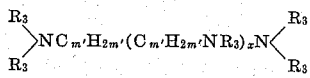

in which $m'$ represents a small whole number varying from 2 to 10; $x$ is a small whole number varying from 0 to 10; $R_3$ is a member of the class consisting of H, $R_4CO$, $R_5CO$, and $R_6$, in which $R_4CO$ represents an acyl radical derived from a detergent-forming monocarboxy acid having at least 8 and not more than 32 carbon atoms, $R_5CO$ is an acyl radical derived from a lower molecular weight carboxy acid having 6 carbon atoms or less; and $R_6$ is a member of the class consisting of alkyl, hydroxyalkyl, aminoalkyl, and acyloxyalkylene, in which instance the acyl group is a member of the class consisting of $R_4CO$ and $R_5CO$; and the acylated polyamine is further characterized by the fact that there must be present a member of the class consisting of (a) Acyloxyalkylene radical, in which the acyl group is $R_4CO$; and
(b) Joint occurrences of an amido radical, in which the acyl group is $R_4CO$ and a hydroxyalkyl radical.

2. A water-soluble ester, as defined in claim 1, wherein all occurrences of $n'$ are 0.

3. A water-soluble ester, as defined in claim 1, wherein all occurrences of $n'$ are 0, and $n$ represents the numeral 2.

4. A water-soluble ester, as defined in claim 1, wherein all occurrences of $n'$ are 0, $n$ represents the numeral 2, and $m$ represents a numeral varying from 7 to 11.

5. A water-soluble ester, as defined in claim 1, wherein all occurrences of $n'$ are 0, $n$ represents the numeral 2, $m$ represents a numeral varying from 7 to 11, and $R_4CO$ is an 18 carbon atom fatty acid residue.

6. A water-soluble ester, as defined in claim 1, wherein all occurrences of $n'$ are 0, $n$ represents the numeral 2, $m$ represents a numeral varying from 7 to 11, $R_4CO$ is an 18 carbon atom fatty acid residue, and the ratio of $p$ to $p'$ is 2 to 1.

7. A water-soluble ester, as defined in claim 1, wherein all occurrences of $n'$ are 0, $n$ represents the numeral 2, $m$ represents a numeral varying from 7 to 11, $R_4CO$ is an 18 carbon atom fatty acid residue, the ratio of $p$ to $p'$ is 2 to 1, and with added neutralization of all residual acidity.

8. A water-soluble ester, as defined in claim 1, wherein all occurrences of $n'$ are 0, $n$ represents the numeral 2, $m$ represents a numeral varying from 7 to 11, $R_4CO$ is a ricinoleic acid residue, the ratio of $p$ to $p'$ is 2 to 1, and with added neutralization of all residual acidity.

9. A water-soluble ester, as defined in claim 1, wherein all occurences of $n'$ are 0, $n$ represents the numeral 2, $m$ represents a numeral varying from 7 to 11, $R_4CO$ is a ricinoleic acid residue, the ratio of $p$ to $p'$ is 2 to 1, with added neutralization of all residual acidity, and $R_1$ is an adipic acid residue.

10. A water-soluble ester, as defined in claim 1, wherein all occurrences of $n'$ are 0; $n$ represents the numeral 2, $m$ represents a numeral varying from 7 to 11, $R_4CO$ is a ricinoleic acid residue, the ratio of $p$ to $p'$ is 2 to 1, with added neutralization of all residual acidity, and $R_1$ is a succinic acid residue.

11. A water-soluble ester, as defined in claim 1, wherein all occurrences of $n'$ are 0, $n$ represents the numeral 2, $m$ represents a numeral varying from 7 to 11, $R_4CO$ is a ricinoleic acid residue, the ratio of $p$ to $p'$ is 2 to 1, with added neutralization of all residual acidity, and $R_1$ is a maleic acid residue.

12. In the manufacture of the esterification product of the kind described in claim 1, the steps of: (A) esterifying a polyalkylene glycol having at least 7 and not more than 17 ether linkages and the alkylene radical thereof containing at least one and not more than 6 carbon atoms, with a polybasic carboxy acid having not more than 6 carbon atoms, in a predetermined ratio of more than 1 and not more than 2 moles of the polybasic acid for each mole of the glycol, to produce a water-soluble product; (B) esterifying one molal proportion of said alkylene glycol dihydrogen acid ester with 2 moles of a basic hydroxylated acylated polyamino compound free from ether linkages, of the following formula:

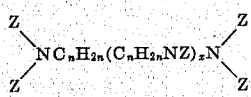

in which $n$ represents a small whole number varying from 2 to 10; $x$ is a small whole number varying from 0 to 10; Z is a member of the class consisting of H, RCO, R'CO, and D, in which RCO represents an acyl radical derived from a detergent-forming monocarboxy acid; R'CO is an acyl radical derived from a lower molecular weight carboxy acid having 6 carbon atoms or less; and D is a member of the class consisting of alkyl, hydroxy alkyl, aminoalkyl, and acyloxyalkylene, in which instance the acyl group is a member of the class consisting of RCO and R'CO; and the acylated polyamine is further characterized by the fact that there must be present a member of the class consisting of: (a) acyloxyalkylene radical in which the acyl group is RCO; and (b) joint occurrence of an amido radical in which the acyl group is RCO and a hydroxyalkyl radical.

MELVIN DE GROOTE.
BERNHARD KEISER.